F. R. SANTORI.
PLOTTING INSTRUMENT.
APPLICATION FILED DEC. 10, 1920.
1,419,645.
Patented June 13, 1922.
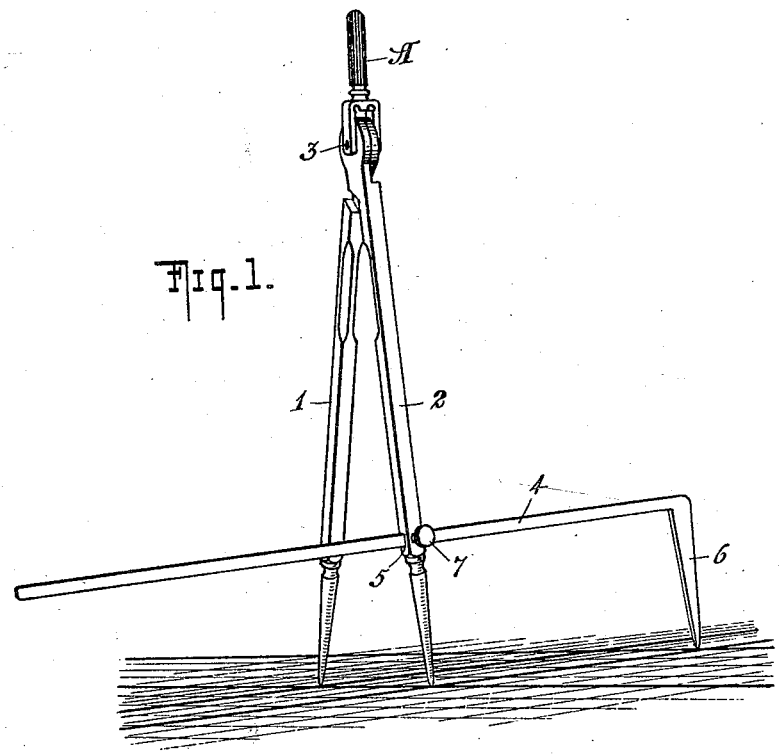
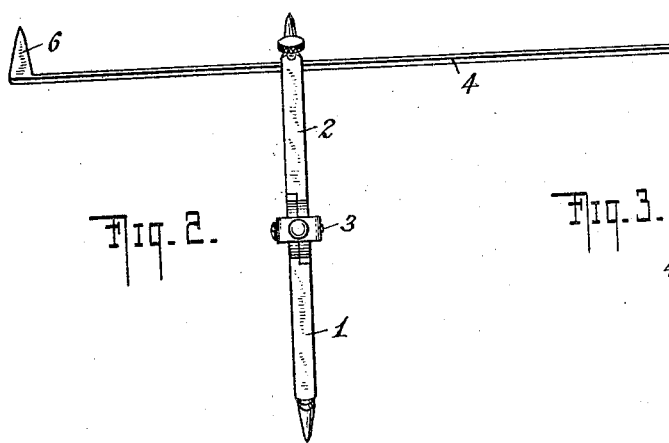
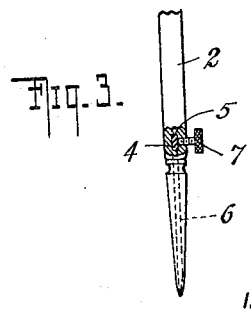
WITNESS
INVENTOR
FRANK R. SANTORI
ATTORNEYS

UNITED STATES PATENT OFFICE.

FRANK R. SANTORI, OF NEW YORK, N. Y.

PLOTTING INSTRUMENT.

1,419,645.  Specification of Letters Patent.  Patented June 13, 1922.

Application filed December 10, 1920. Serial No. 429,631.

*To all whom it may concern:*

Be it known that I, FRANK R. SANTORI, a citizen of the United States, and a resident of the borough of Manhattan, city and State of New York, have invented certain new and useful Improvements in Plotting Instruments, of which the following is a specification.

This invention relates to a plotting instrument and is particularly advantageous for use in making nautical calculations.

In the drawings Fig. 1 is a perspective view of the instrument; Fig. 2 is a top plan view thereof; Fig. 3 is an enlarged view of the means for slidably holding and retaining one of the elements of the instrument in position.

The instrument comprises the customary dividers A with the legs 1 and 2 pivotally connected at 3. One of the legs, as for instance the leg 2, is provided with a member 4, slidably mounted in the guide way 5. A pointer or indicator 6 is secured at a right angle to an end of the member 4 and is intended for use in connection with the dividers for instance in plotting the position of a ship at sea.

The member 4 is preferably rectangular in a cross-section and fits quite snugly in the guide way 5, which in such case is also rectangular in cross-section, whereby the member 4 is secured against turning. The member 4 may thus be moved to a given position on the chart in relation to a position of the dividers A. The member 4 may be secured at any extended position from the dividers A by the set-screw 7.

It is to be observed that the guide way 5 is at a right angle to the axis of the leg 2 and consequently the axis of the adjustable member 4 is at right angles to the axes of the legs 1 and 2, (their axes being in the same plane). The relative position of the members 1, 2 and 4, when the indicator 6 is adjusted to a point spaced from the leg 2, will always result in laying down a right angle defined by a straight line drawn through the points of the legs 1 and 2 and an intersecting straight line drawn through the points of the leg 2 and the indicator 6.

While the illustrated example shows a preferred arrangement of the plotting instrument, it will, of course, be understood that the same may be replaced by any other construction which includes an intermediate pointer corresponding to the one which forms the continuation of the leg 2 and additional pointers corresponding respectively to the one which constitutes a continuation of the leg 1, and to the pointer 6 and connected with said intermediate pointer so as to be adjustable relatively thereto in directions transverse to each other upon a common plane, in combination with means for fixing one of said additional pointers in its adjusted position against movement relative to the said intermediate pointer.

What I claim is:

1. A plotting instrument comprising an intermediate pointer, two additional pointers connected with said intermediate pointer, and adjustable relatively thereto in directions transverse to each other upon a common plane, all of said pointers having a fixed relation to each other in which the active ends thereof are capable at all times of coincidentally engaging a surface in said plane, and means for fixing one of said additional pointers in its adjusted position against movement relatively to said intermediate pointer.

2. A plotting instrument comprising a pair of legs pivotally connected at one end, a member slidably mounted upon one of said legs and adjustable relatively thereto in directions at right angles to an imaginary line connecting the free ends of said legs, a pointer carried by said member and adjustable thereby to different distances from said leg without changing the angular position of said member relatively to the leg upon which it is mounted and means for securing said member in an adjusted position.

3. A plotting instrument comprising a pair of legs pivotally connected at one end, a member slidably mounted upon one of said legs and adjustable relatively thereto in directions parallel to the pivot about which said legs are pivotally movable, said member being fixed against rotation about its axis relatively to the leg upon which it is mounted, and a pointer carried by said member and adjustable thereby to different distances from said leg without affecting the parallelism of said member to said pivot.

In testimony whereof I have hereunto set my hand.

FRANK R. SANTORI.